July 19, 1932.   E. A. SPERRY   1,867,683
COMBUSTION ENGINE
Filed Oct. 22, 1923
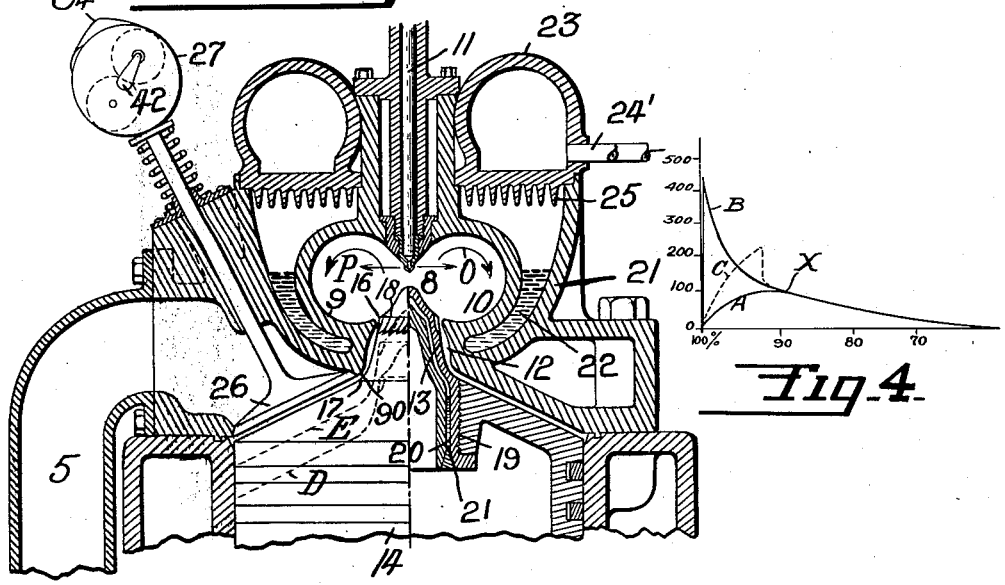
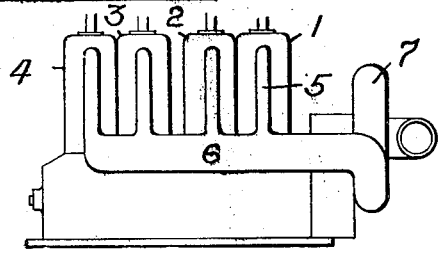
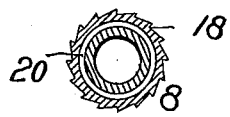
Inventor
Elmer A. Sperry.
By his Attorney
Hubert H. Thompson Patented July 19, 1932

1,867,683

UNITED STATES PATENT OFFICE

ELMER A. SPERRY, OF BROOKLYN, NEW YORK, ASSIGNOR TO THE SPERRY DEVELOPMENT COMPANY

COMBUSTION ENGINE

Application filed October 22, 1923. Serial No. 669,940.

This invention relates to combustion engines of the Diesel or semi-Diesel type, wherein the oil or other liquid fuel is projected directly into the hot compressed gases within the cylinder. In this type of engine the time during which the fuel is mixed with air prior to burning is extremely short as compared to the Otto cycle, wherein the fuel and air are intimately mixed in the carbureter outside of the cylinder. One would expect therefore that in the Diesel cycle, more air would be required per B. H. P. than in the Otto cycle. Such in fact is found to be the case, the ordinary Diesel cycle requiring almost twice as much air as the Otto cycle, with corresponding losses directly and indirectly.

It is the purpose of the present invention to overcome this disadvantage of the Diesel cycle by making up for the extreme shortness of time during which the oil and air intermingle, by imparting to the air an extremely high velocity, preferably in the form of rotation. By my invention I gradually build up an enormous swirling velocity of the air in a mixing chamber forming the clearance space, of from 50,000 to 100,000 R. P. M., so that the high velocity air secures more intimate association and instantaneous mixture. It literally tears asunder and completely atomizes the oil jets encountering it. I am aware that efforts have been made in the past to accomplish complete comingling of the liquid fuel by a high velocity of the oil jet; (also by the Diesel air blast) and by different kinds of turbulence of the air. These, however, are not sufficient to secure the results of my invention. Since air is many hundred times less viscous than the fuel and therefore more mobile, lending itself more perfectly to attaining enormous physical velocities, I employ it to meet this problem and utilize these great velocities as a substitute for time.

Referring to the drawing wherein I have shown what I now consider to be the preferred form of my invention, Fig. 1 is a vertical section of the upper portion of one cylinder of a two cycle combustion engine constructed in accordance with my invention.

Fig. 2 is a diagrammatic side elevation of a complete four cylinder engine with supercharger attached.

Fig. 3 is a section through the upper portion of the projection on the piston.

Fig. 4 is a diagram showing the comparative air velocities in the cylinder achieved by the methods of the prior art, as compared to the methods of the present invention.

Referring to the engine shown in Figs. 1 and 2, I here illustrate a multi-cylinder engine comprising cylinders 1, 2, 3 and 4, each having an air induction passage 5 connecting with a common passage 6 which leads to the supercharger 7. Each cylinder is provided with a mixing chamber 8 forming the greater part of the clearance space of the cylinder. Said chamber 8 is preferably made in the form of a hollow annulus at vortex chamber, the vertical section of which appears as two lobes or swirling chambers 9, 10. Centrally situated in said chamber is the fuel injection valve 11, which preferably injects the oil, or other liquid fuel under high pressure directly into the combustion space. As shown, the injection valve preferably forms the upper central dividing point or line between lobes 9 and 10, the shape of the valve being made to conform in general to the substantially circular walls of the vortex chambers. The valve preferably operates to project the oil radially, or laterally, across the vortex chamber in all directions as indicated by arrows P.

The mixing chamber is connected to the main cylinder by a throat 12 of special contour, through or into which a projection 13 on the piston 14 is adapted to project as the piston nears the end of its stroke. I am aware that it has been proposed to separate the mixing chamber from the cylinder by a throat into which a projection on the cylinder enters, but prior workers have failed to attain the high velocity of the air in the chamber so essential to complete association of air and oil, which I obtain by my invention. The advance made by the present invention in the art may be realized by an inspection of Fig. 4. This figure represents the air velocities through the throat during the last 30 degrees of the piston stroke, the ordinates indicating the velocities of the gases through the throat into the combustion chamber. The common curve to the right of the point X and the curve marked A represent the natural flow through the aperture due to the advance of the piston, i. e., if no projection were used on the piston. At the point X the plug 13 starts to enter the throat, as shown in dotted lines in position D of Fig. 1. Curve C, on the other hand, shows the condition obtained when a parallel sided throat and a projection on the piston are used, such as has been proposed in the prior art. It will be noted that this curve takes a sudden rise just after the plug enters the throat, comparable to a hammer blow, but immediately drops off rapidly as the piston slows down, so that finally at about the time oil should be injected, the air has no greater jet velocity than if the plug had not been used. Heretofore in this art, the fact that the piston is rapidly decelerating at the end of its stroke and the fact that the highly compressed air toward the end of the stroke of the piston is very dense and possesses loose inertia has not been recognized by prior workers. With my invention, on the other hand, the air already in the combustion chamber, is not given a single hammer-like blow which only causes agitation and eddies, but is given a persistent and constantly accelerating push, which as it is well known in the art of mechanics, is the only way to start and finally attain high rotary motion in a body having much inertia.

The purposes of my invention are accomplished by designing the throat and plug so that a gradually increasing velocity is imparted to the air as shown by curve B of Fig. 4. Referring to Fig. 1, the throat at point 90 where the plug enters it (as shown in dotted lines) is appreciably larger than the entering plug so as to provide an annular space of considerable proportions for the air to rush through. From this point on, the orifice or throat becomes more and more rapidly contracted as the plug advances and the piston slows down, the plug passing through the dotted line position E, still more constricting the annular aperture, until the dead center position is reached, as shown in full lines in Fig. 1, near this the clearance between the two is very small. As the plug ascends the speed of the piston however is very rapidly slowing down, but the contour of the throat in combination more or less with the shape of the plug is so designed as to give a more or less constant increase to the velocity of the gases through the annular channel between the plug and throat, which velocity attains a very high terminal value and gives a velocity curve approximating that of full line curve B. This gradual and ever increasing urge or energization as illustrated by curve B, is very necessary in gradually accelerating the vortex-like swirl of the air, finally bringing it up to an exceedingly high pitch. It is not difficult to obtain a rotation of 100,000 R.P.M. and over by my invention.

The plug is shown as of a general conical or conoidal shape from the point 16 thereon downwardly to its base 17, where it merges into the upper portion of the piston. Above the point 16 which lies opposite the upper portion of the throat in the upper-most position of the piston, the plug may be shaped so as to complete the contour of the two lobes 9 and 10 of the mixing chamber, thus assisting the smooth true vortex action of the air.

As so far described, it will be seen that the vortex of the air will be substantially in the direction of the arrows O, namely, an outward swirl in vertical radial planes from all sides of the plug. Such an action it will be seen will cause the air to cut even an "instantaneous" stream of oil throughout its length a great many times. In addition to this vortex action, I may also impart to the air a motion in a more or less horizontal plane, that is, a circumferential motion around the annulus. This is also accomplished gradually by providing the surface of the plug, say, with spiral-like flutes 18, which it will be seen give a twist to the air streams rushing by the plug as it passes through the throat. Preferably said flutes are cut only at the upper working shoulder of the plug, since that is a point of highest velocity as the air is entering the combustion chamber, the air impinging the flutes being a greater and greater percentage of the air passing as the plug advances.

As shown, the plug is preferably removably fixed in the piston top, as by being threaded in an aperture 19 in the top of the piston. On account of the tremendous air velocities encountered by the plug, I prefer to cool the same as by providing it with an internal channel 20 sealed as by welding at its lower end and partially filled with a liquid, such as mercury 21, or a mixture of nitrates which has the advantage of "wetting" the surfaces which serves to carry the heat from the exterior upper portion of the plug to the cooler interior and lower portion theeof.

Preferably also, I provide cooling means for the mixing chamber. I have found however an instantaneous loss of efficiency of the engine if the mixing chamber is cooled too vigorously. I prefer therefore to make the jacket 21 surrounding the chamber of a special form and to place in the same a small quantity say, of mercury 22. By using a liquid such as mercury, having a higher boiling point than water, I thus permit the mixing chamber to be operated at a higher temperature than the boiling point of water, and at the same time preventing it from operating at low red heat or above, which has been found to have the detrimental effect probably in cracking the oil before combustion. To insure proper cooling of this medium, I provide in addition, an annular water chamber 23 through which water is circulated as by pipes 24, 24'. Said chamber has on the undersurface thereof, cooling or condensing ribs 25 which provide a large condensing surface for the evaporating media.

The induction valve 26 may be located to one side of the top of the piston and is operated by timing cam 27.

From the foregoing, the operation of my invention will be apparent. As the piston nears the top of the compression stroke, the projection 13 starts to enter the throat 12. As this occurs the opening through the throat is reduced to an annular channel between the projection and throat, through which the air is forced at higher velocity by the rising piston. As the piston ascends, the projection enters the more and more restricted portions of the throat, thus further increasing the velocity of the air passing through the annular nozzle until finally at the instant prior to the end of the stroke, the velocity becomes a maximum as indicated by curve B, Fig. 4. Due to the spiral notches on the projection as explained, the air is given a swirl in a more or less horizontal plane, as well as a vortex swirl in vertical radial planes. At about the completion of the compression stroke or shortly prior thereto, the oil is injected in many jets across the vortex of intensely swirling, dense, hot air, being instantly atomized and widely dispersed is then ignited by the heat of the same. The working stroke then takes place in the usual manner.

In accordance with the provisions of the patent statutes, I have herein described the principle of operation of my invention, together with the apparatus, which I now consider to represent the best embodiment thereof, but I desire to have it understood that the apparatus shown in only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. In a combustion engine in which the oil or other liquid fuel is injected into compressed air, a combustion chamber, a cylinder, a piston operating in said cylinder, and means whereby a gradually increasing air swirl of high terminal velocity is set up as the piston approaches and until it arrives at the end of its compression stroke, said means including a throat connecting said chamber and cylinder and increasing in diameter from said combustion chamber to its conjunction with said cylinder, a projection carried by said piston and adapted to enter said throat near the end of the compression stroke, and means for cooling said projection.

2. In a combustion engine in which the oil or other liquid fuel is injected into compressed air, a combustion chamber, a cylinder, a piston operating in said cylinder, and means whereby a gradually increasing air swirl of high terminal velocity is set up as the piston approaches the end of its compression stroke, said means including a throat connecting said chamber and cylinder and increasing in diameter as it approaches conjunction with said cylinder, and a projection carried by said piston and adapted to enter said throat near the end of the compression stroke, said projection having a generally conical shape, said throat being so shaped that as said conical projection enters therein the orifice so formed decreases at an increasing rate corresponding to decreased speed of the piston to yield continuously increasing velocity of air to the end of the piston stroke.

3. In a combustion engine in which the oil or other liquid fuel is injected into compressed air, a combustion chamber, a cylinder, a piston operating in said cylinder, and means whereby a gradually increasing air swirl of high terminal velocity is set up as the piston approaches and until it arrives at the end of its compression stroke, said means including a throat connecting said chamber and cylinder and increasing in diameter from said combustion chamber to its conjunction with said cylinder, and a projection carried by said piston and adapted to enter said throat near the end of the compression stroke, the contour of the upper end of said projection cooperating with the contour of said combustion chamber to form a vortex chamber.

4. In a combustion engine in which the oil or other liquid fuel is injected into compressed air, a vortex-shaped combustion chamber, a cylinder, a piston operating in said cylinder, and means whereby a gradually increasing air swirl of high terminal velocity is set up as the piston approaches and until it arrives at the end of its compression stroke, said means including a throat connecting said chamber and cylinder and increasing in diameter from said combustion chamber to its conjunction with said cylinder, and a projection carried by said piston and adapted to enter said throat near the end of the compression stroke, said projection having the major portion thereof in the form of a truncated cone and the top thereof of flatter conoidal shape, the top thereof forming the center of the vortex chamber.

5. In a combustion engine, the combination of means formed on the piston face and means connecting the piston cylinder and combustion chamber cooperating with said first means to form a progressively decreasing orifice as said first means enters said second means to give a substantially gradual acceleration to air passing into the combustion chamber on the compression stroke of the piston substantially till the end of the piston stroke.

6. In a combustion engine, the combination with the cylinder and combustion chamber, of a throat of varying diameters connecting said cylinder and chamber, and a piston having a plug arranged to enter said throat, the distribution of the said diameters being such that in cooperation with said plug, the velocity of the fluids passing to the combustion chamber is gradually accelerated substantially till the end of the piston stroke, as described.

7. In a combustion engine, the combination with the cylinder, combustion chamber and means for injecting fuel into said chamber of a piston having a tapered projection thereon, a throat connecting the cylinder and combustion chamber and having an upwardly tapering contour arranged to give a gradually increasing velocity to the fluids passing into the combustion chamber by the cooperation of said projection adapted to enter the said throat while the piston is gradually decreasing in velocity towards the end of the stroke, and a directing means within the said chamber for causing the entering fluid stream to repeatedly cut across the stream of fuel injected into said chamber.

8. In a combustion engine, the combination with the cylinder, combustion chamber and means for injunction fuel into said chamber of a piston having a projection thereon, a throat connecting the cylinder and combustion chamber and having an upwardly tapering contour throughout its length arranged to give a gradually increasing velocity to the fluids passing into the combustion chamber by the cooperation of said projection adapted to enter the said throat while the piston is gradually decreasing in velocity towards the end of the stroke, and a deflecting means within the said chamber for causing the entering stream to repeatedly cut across the stream of fuel injected into said chamber.

9. In a combustion engine, the combination with the cylinder and combustion chamber, of a piston having a head, a throat connecting the cylinder and combustion chamber, a projection on the head for entering the said throat, said projection and throat being so formed as to leave an annular passage outside the projection which contracts substantially throughout the length of said throat as the entrance of the plug advances to give a gradually increasing velocity to the fluids passing into the combustion chamber by the action of the piston as it gradually decreases in velocity towards the end of its stroke.

10. In a combustion engine, the combination with the cylinder and combustion chamber, of a piston having a head, a throat connecting the cylinder and combustion chamber, a projection on the head for entering the said throat at a point considerably back of the end of the stroke, said projection and throat being so formed as to leave an annular passage outside the projection which contracts substantially throughout the length of said throat as the entrance of the plug advances to give a gradually increasing velocity to the fluids passing into the combustion chamber by the action of the piston as it gradually decreases in velocity towards the end of its stroke.

11. In a combustion engine, the combination with the cylinder and combustion chamber, of a piston having a head, a throat connecting the cylinder and combustion chamber, a projection on the head for entering the said throat, leaving an annular passage outside the projection the percent of decrease of whose area is greater than the simultaneous percent of decrease of piston velocity to such an extent as to give a gradually increasing velocity to the fluids passing into the combustion chamber by the action of the piston as it gradually decreases in velocity until the end of its stroke.

In testimony whereof I have affixed my signature.

ELMER A. SPERRY.